(12) United States Patent
Slater et al.

(10) Patent No.: US 8,650,339 B2
(45) Date of Patent: Feb. 11, 2014

(54) CONTROL OF DATA TRANSFER

(75) Inventors: Alastair Slater, Chepstow (GB); Simon Pelly, Bristol (GB); Matthew Jack Burbridge, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1841 days.

(21) Appl. No.: 11/945,458

(22) Filed: Nov. 27, 2007

(65) Prior Publication Data

US 2008/0183908 A1 Jul. 31, 2008

(30) Foreign Application Priority Data

Jan. 30, 2007 (GB) .................................. 0701685.0

(51) Int. Cl.
*G06F 13/14* (2006.01)
*G06F 15/173* (2006.01)

(52) U.S. Cl.
USPC ........................................... 710/33; 709/238

(58) Field of Classification Search
USPC .......................................................... 710/33
See application file for complete search history.

(56) References Cited

U.S. PATENT DOCUMENTS

| 5,210,829 A * | 5/1993 | Bitner .............................. 710/57 |
| 5,987,565 A | 11/1999 | Gavaskar |
| 6,675,218 B1 * | 1/2004 | Mahler et al. .................. 709/230 |
| 7,448,049 B1 * | 11/2008 | Xing ............................. 719/318 |
| 8,087,021 B1 * | 12/2011 | Holdman et al. .............. 718/102 |
| 2005/0210479 A1 * | 9/2005 | Andjelic ....................... 719/321 |
| 2005/0240941 A1 * | 10/2005 | Hufferd et al. ................ 719/321 |
| 2007/0255866 A1 * | 11/2007 | Aloni et al. ..................... 710/52 |
| 2008/0126599 A1 * | 5/2008 | Wei et al. ........................ 710/22 |

FOREIGN PATENT DOCUMENTS

EP 1 094 392 A1 4/2001

* cited by examiner

*Primary Examiner* — Titus Wong

(57) ABSTRACT

A system for managing data transfer using an operating system address space, the address space comprising a user space and a kernel space, the system comprising a data buffer in the kernel space and a control module for the data buffer in the user space, the system further comprising a network protocol handling module that receives an I/O request in the kernel space for performing an I/O operation on the data buffer. The network protocol handling module notifies the control module of the I/O request via an upper level protocol handling module. The control module maintains address pointers in the data buffer and informs the network protocol handling module of the buffer address at which the I/O operation is to be performed.

16 Claims, 5 Drawing Sheets

CONTROL OF DATA TRANSFER

BACKGROUND

In UNIX-like operating systems, it is conventional to use a memory addressing scheme that has two address space mappings, a user space for user programs and a kernel space for operating system related processes. It is a feature of UNIX-like operating systems that input/output (I/O) operations generally result in data being copied between the user and kernel address spaces. This copying may have a detrimental effect on I/O performance. Embodiments of the present invention aim to minimize such copying, which is also referred to as a zero copy solution.

BRIEF DESCRIPTION OF THE DRAWINGS

Embodiments of the invention will now be described by way of example, with reference to the accompanying drawings, in which.

DETAILED DESCRIPTION

Figure 1:
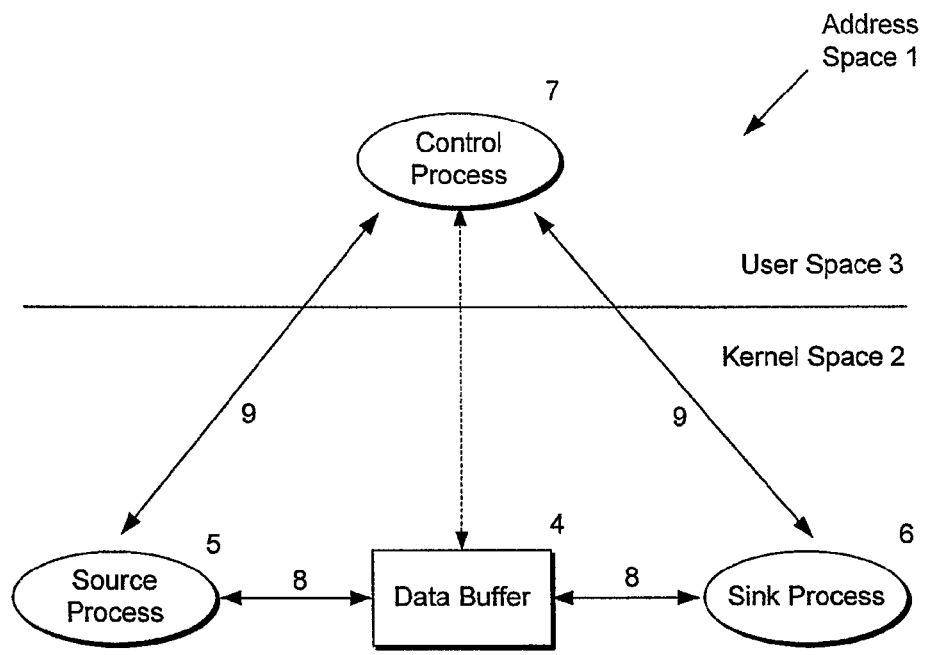
FIG. 1 is an overview of a system according to an embodiment of the invention.

Referring to FIG. 1, an operating system address space 1 is divided into a kernel space 2 and a user space 3. The operating system is for example a UNIX or UNIX-based system, including but not limited to Linux. The kernel space 2 includes a data buffer 4 which is accessed by a source process 5 and a sink process 6. The user space 3 includes a control process 7 that controls the flow of data into and out of the data buffer 4.

Data flows 8 between the source and sink processes 5, 6 are confined to the kernel space 2. Only control and address information 9 flows between each of the sink and source processes 5, 6 and the control process 7, indicating to the sink and source processes where in the data buffer 4 data is or should be stored.

Figure 2:
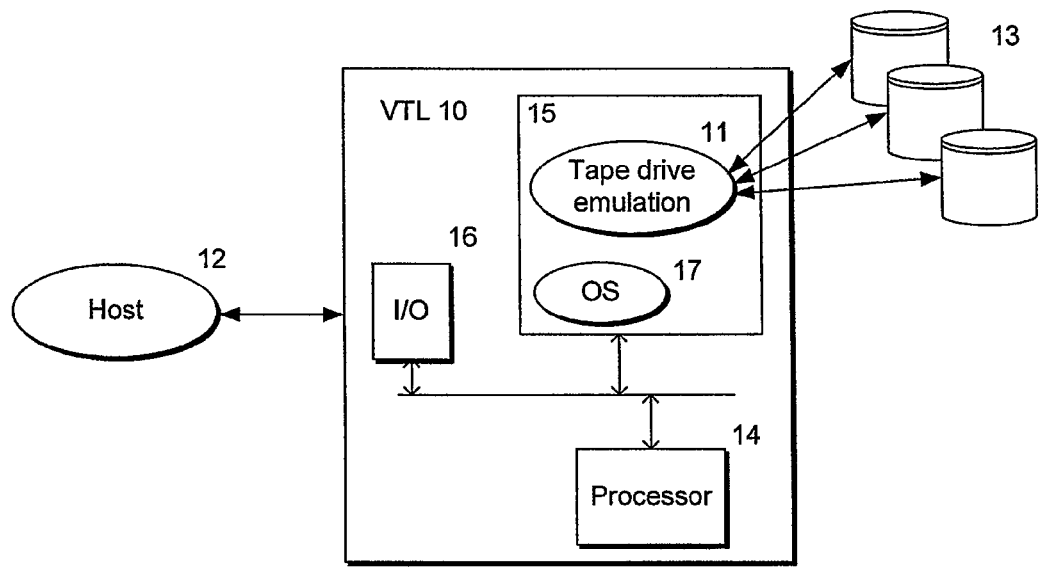
FIG. 2 illustrates a virtual tape library system.

A system according an embodiment of the invention is described with reference to a device emulation scheme, for example in the context of a virtual tape library system. A virtual tape library system (VTL) 10, as illustrated in FIG. 2, is one that uses tape peripheral device emulation software 11 to present, to a host 12, a storage medium such as a disk array 13, as if it were a conventional tape drive or tape library. This permits integration with existing archival systems and backup software that is designed to work with tape drive backup systems. It will be understood by the skilled person that a virtual tape library system includes all of the hardware and software required for it to carry out its function, including a processor 14, internal memory 15, a network interface module 16 and so on. Operating system software 17, for example a UNIX-based operating system, is resident in the memory 15, as will be described in more detail below.

Figure 3:
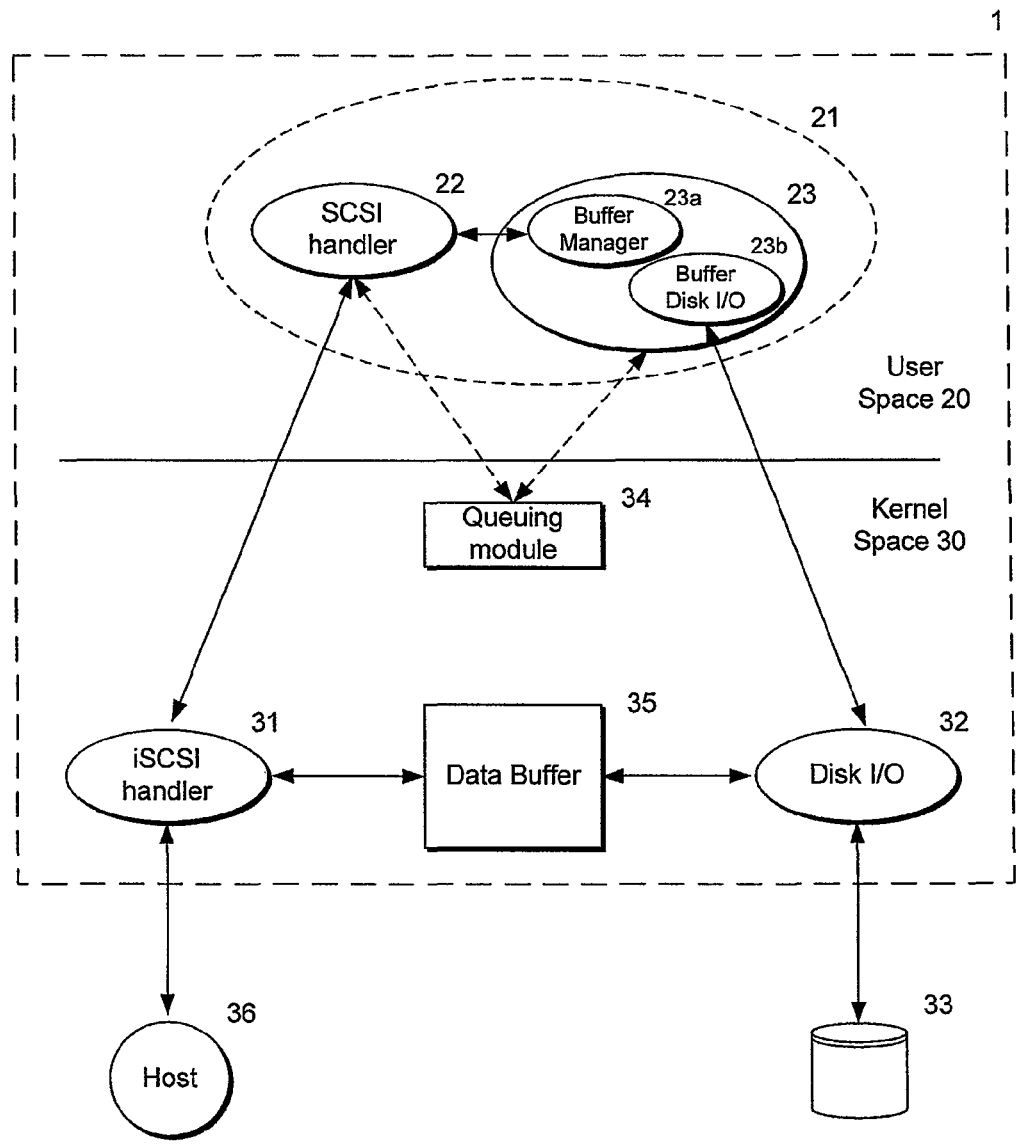
FIG. 3 illustrates the components of a virtual tape library system according to an embodiment of the invention.

Referring to FIG. 3, in a system according to an embodiment of the invention, an address space 1 maintained by the operating system software 17 is divided into a user space 20 and a kernel space 30. Each space has a number of processes running within it, each process being a running instance of a program or software module. The user space 20 includes a peripheral device emulation module 21, for example for emulating a tape drive. The emulation module 21 includes an upper level protocol handling module 22 and a control module 23. The control module 23 comprises a buffer manager thread 23a and a buffer disk I/O thread 23b, the functionality of which will be described in more detail below.

The kernel space 30 includes a number of software modules that may be implemented as loadable drivers or which are statically present within the operating system environment. These include a lower level protocol handling module 31, also referred to herein as an interface module, a storage medium I/O module 32, for example a disk I/O module 32 for controlling reading and writing to a disk 33, a queuing module 34 and a kernel buffer module 35 for providing data storage in the kernel space.

The lower level protocol handling module 31, which may be a network protocol handling module, is accessed by an external host 36.

In this example, the upper level protocol is the SCSI protocol, although it is not limited to this and any suitable protocol may be used.

In this example the lower level protocol is the iSCSI protocol, although as with the upper level protocol, it is not limited to this and any other suitable protocol may be used, for example the Fibre Channel protocol, USB, serial attach SCSI and so on.

Figure 4:
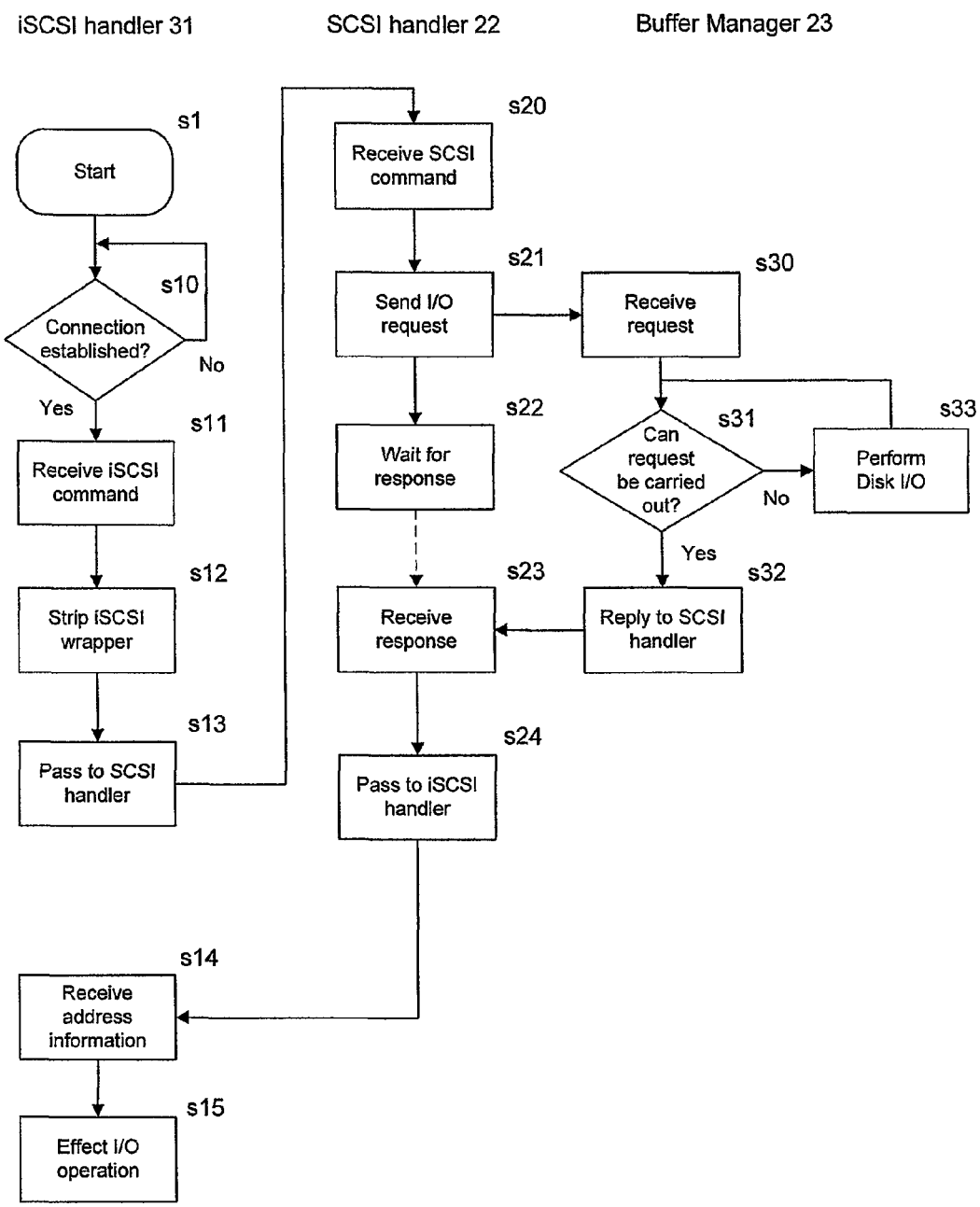
FIG. 4 is a flowchart illustrating the operation of the system of FIG. 3.

FIG. 4 explains the operation of the system shown in FIG. 3.

From the start of the system (step s1), the upper level protocol handling process 31, in this example the iSCSI handler, awaits connections from the host 36 (step s10). The host 36 sends iSCSI commands requesting read or write access to a particular target drive. When a connection is established and an iSCSI command received (step s11), the iSCSI handler 31 strips the iSCSI wrapper from the command (step s12) and passes the SCSI command to the upper level protocol handling process 22, in this example the SCSI handler 22 (step s13).

The SCSI handler 22 waits for events using the queuing module 34, for example by issuing a read( ) system call on a device file that blocks until an event occurs to unblock the read( ) call. The unblocking is in this example caused by the iSCSI handler 31 writing to the queuing module via the same device file, the device file being the file corresponding to the target drive that is the subject of the request from the host.

Once the SCSI handler process 22 awakes and receives a valid SCSI command (step s20), it sends a message to the buffer manager thread 23a to inform it that it wishes to perform an I/O operation, for example to write a specified number of bytes (step s21). The SCSI handler 22 then awaits a response, again by issuing a read( ) system call on the device file to block (step s22).

Figure 5:
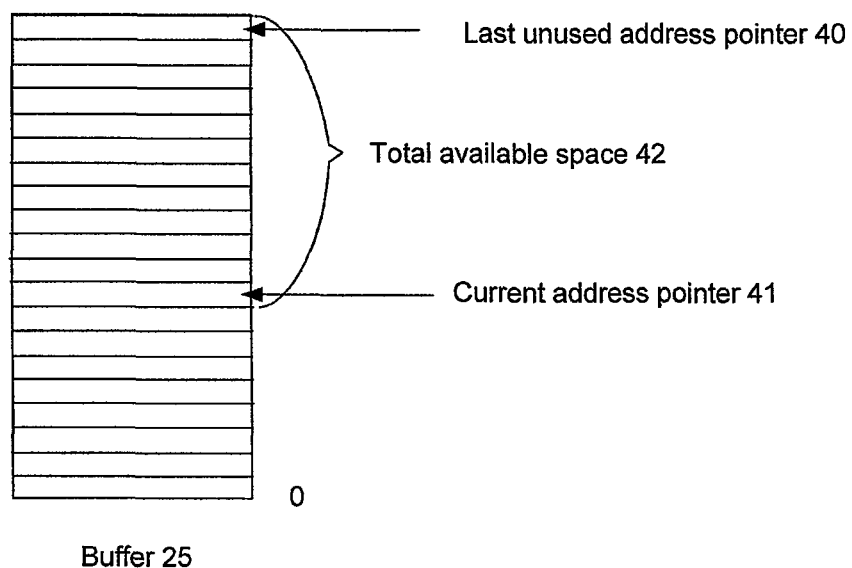
FIG. 5 illustrates the address pointer structure associated with a data buffer that forms part of the system of FIG. 3.

The buffer manager thread 23a receives the message from the SCSI handler 22 (step s30) and determines whether it can satisfy the request, for example by determining if there is sufficient space to store the data in the buffer 35 corresponding to the target drive (step s31). As shown in FIG. 5, the buffer manager thread 23a keeps track of the address space pointers 40, 41 used in the buffer and can therefore determine the total available space 42 from the last unused address pointer 40 and the current address pointer 41, that indicates the next free space in the buffer 25.

If the request from the host can be satisfied, the buffer manager thread 23a sends a message to the SCSI handler 22 including the current address pointer information 42, and writes to the queuing module 34 to alert the SCSI handler 22 that it has a message to read (step s32). In the case where there is insufficient space to store the data, the buffer disk I/O thread 23b will make space by instructing the disk I/O module to write some of the buffer data out to disk (step s33). As a result, on the next pass (step s31), the buffer manager thread 23a determines that space is available in the buffer and returns the current pointer address information back to the SCSI handler 22. This aspect of the operation of the control module 23 will be explained in further detail below.

The SCSI handler 22 receives the message (step s23) and in turn provides the current address pointer information to the iSCSI handler 31 (step s24). The iSCSI handler 31 receives the current address pointer information (step s14) and uses it to effect the I/O operation into or out of the kernel buffer 25 (step s15).

For example, when a 64 KB write operation is required by the host, the SCSI handler 22 informs the buffer manager 23a in user space that it wishes to perform a 64KB write to the tape device specified by the host. The buffer manager 23a determines that the requested write can be made using address offsets 0 to 65535, and passes this information back to the SCSI handler 22. It also updates its current address pointer information to the next free location for subsequent requests, which in this example starts at offset 65536. The SCSI process 22 in turn passes the address offset information to the iSCSI handler 31, which effects the write using the address offsets specified.

A read operation proceeds in an analogous way. When a read request is initially received (step s30), the buffer manager enters read mode, which wakes the buffer disk I/O thread. If there is insufficient data available in the buffer to satisfy the read request (step s31), then the buffer manager waits for data. Once the buffer disk I/O thread is awake, it instructs the kernel side disk I/O module 32 to read data from disk (step s33). Once data has been read from the disk, into the buffer, then on the next pass of the buffer manager 23a, it replies to the SCSI handler with the address information for the data (step s32). It will be understood by the skilled person that other replies are possible, for example a reply with an error indicating that the full amount of requested data is not available. Such conditions will not be considered further in this application.

Within the control process 23, the buffer manager 23a and buffer disk I/O 23b threads can run concurrently, so that the buffer manager thread 23a can service requests from the SCSI handler 22, while the buffer disk I/O thread 23b is communicating with the kernel side disk I/O module 32.

Figure 6:
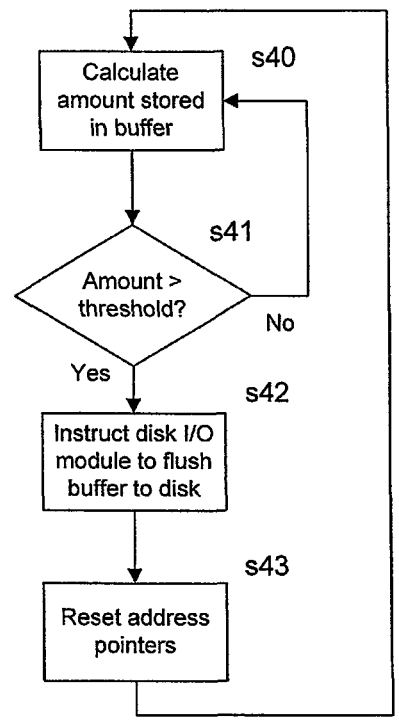
FIG. 6 is a flowchart illustrating a disk flush operation during a write operation of a buffer disk I/O process that forms part of the system of FIG. 3.
Figure 7:
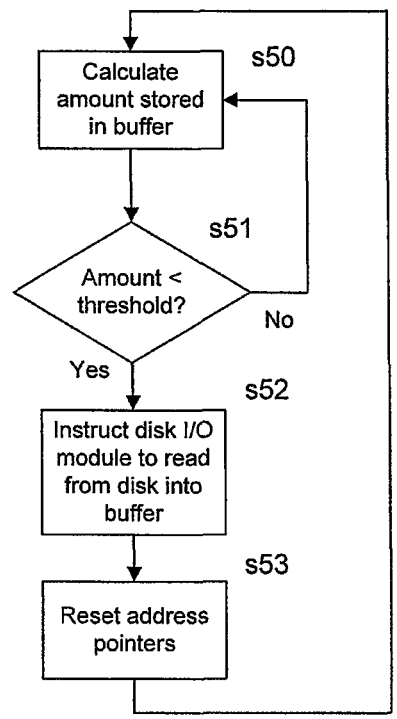
FIG. 7 is a flowchart illustrating a disk read-ahead operation of a buffer disk I/O process that forms part of the system of FIG. 3.

As mentioned above, part of the function of the buffer disk I/O thread 23b, illustrated in FIGS. 6 and 7, is to periodically check whether an I/O transfer should occur to disk, or elsewhere, for example across a network. If so, it issues a call to the kernel side disk I/O module 32 to inform it that a disk I/O should occur. An example format for the request is shown below:

```
disk_io_request {
    unsigned long long address_in;
    unsigned long long address_out;
    unsigned long long n_bytes;
}
```

The address fields specify where the I/O operation should occur to and from, relative to the buffers maintained in kernel memory by the buffer module.

For example, the buffer disk I/O thread 23 calculates how much data is stored in the buffer (step s40). For this purpose, two pairs of variables are used per virtual buffer: DataIn and DataOut, HostIn and HostOut, which are shared between the buffer manager and buffer disk I/O threads. For writing, HostIn and DataOut are used together, whereas for reading HostOut and DataIn are used together. In either case, both variables are initialised to zero.

When writing, data comes in and HostIn is incremented by the amount of data that is received. As data is flushed to disk, DataOut is incremented by the amount of data flushed. The amount of data that remains in the buffer to be flushed out to disk is therefore (HostIn-DataOut).

In the case of reading, DataIn is incremented as data as read in from disk, and HostOut is incremented as the data is read out by the host.

For writing, as shown in FIG. 6, the amount of data stored in the buffer (HostIn-DataOut) is compared with a predetermined threshold (step s41). If the amount is less than the predetermined threshold, no action is taken but monitoring is continued. If the amount exceeds the predetermined threshold, the buffer disk I/O thread 23b calls the disk 110 module 32 to write the data to disk 33 (step s42) and resets the address pointers to reflect the next free location (step s43). It then returns to its original operation of monitoring the data stored in the buffer (step s40), after an appropriate amount of data has been flushed to disk.

The purpose of this sequence of operations is to determine whether the buffer 25 is sufficiently full to justify the buffer being flushed to disk, to avoid the overhead of multiple writes of small amounts of data. The predetermined threshold may be set to a level that is optimal for the disk 33. For example, if the host 36 is carrying out a series of 512 byte writes, the buffer disk I/O thread 23b may wait until 512 KB, or some other predetermined amount, of data has accumulated before performing a disk write, to ensure better performance for the disk write process.

Referring to FIG. 7, in the case of a read request, the buffer disk I/O thread 23b seeks to keep a minimum threshold of data in the buffer 25 by instructing the disk I/O module 32 to read ahead from what is on the disk (step s52), if the calculated amount of data in the buffer (DataIn-HostOut) (step s50) is below a predetermined threshold (step s51). Once an appropriate amount of data has been read in from disk (step s52), the process returns to its original operation of monitoring the data (step s50).

It will be apparent from the above description that since the only information that needs to pass between the user and kernel spaces is the address information for the buffer for I/O operations to occur from and to, only a single copy of the data to be transferred can be maintained in the kernel space, and the copying of data between the user and kernel spaces can be avoided. I/O throughput rates may therefore be improved.

In addition, it will be apparent from the above description that some of the code for implementing the invention is provided in the kernel space and some in the user space. This partitioning may be beneficial for some open source licenses, such as the GNU GPL, where kernel space pieces have to be open sourced, but the user space pieces can be kept private.

Although a specific architecture has been described in relation to an embodiment of the invention, other architectures, protocols and structures could alternatively be used to provide for data transfer to be confined to the kernel space, while being controlled from the user space.

The invention claimed is:

1. A system for managing data transfer using an operating system address space, the operating system address space comprising a user space and a kernel space, the system comprising:
- a data buffer in the kernel space;
- a control module for the data buffer, the control module in the user space and arranged to maintain address information for the data buffer;
- an interface module for receiving an I/O request in the kernel space for performing an I/O operation on the data buffer to transfer data into or out of the data buffer in the kernel space, the interface module comprising a lower level protocol handling module; and
- an upper level protocol handling module in the user space configured to receive the I/O request from the lower level protocol handling module and to pass the I/O request to the control module;
- wherein the interface module is arranged to notify the control module of the I/O request and to receive address information from the control module for controlling the I/O operation; and
- wherein the data to be transferred into or out of the data buffer is not copied between the kernel space and the user space.

2. A system according to claim 1, wherein the lower level protocol handling module comprises an iSCSI protocol.

3. A system according to claim 1, wherein the upper level protocol handling module comprises an SCSI protocol.

4. A system according to claim 1, wherein the control module is arranged to determine if the I/O request can be carried out, and in the event that the I/O request can be carried out, to notify the upper level protocol handling module accordingly.

5. A system according to claim 1, wherein the control module is arranged to determine, based on the amount of data stored in the data buffer, whether data in the data buffer is to be written from the data buffer to a storage medium.

6. A system according to claim 5, wherein the control module is arranged to determine that data in the data buffer is to be written out from the data buffer when the amount of data stored in the data buffer exceeds a predetermined threshold.

7. A system according to claim 1, wherein the control module is arranged to determine, based on the amount of data in the data buffer, whether data is to be read into the data buffer during a read operation.

8. A system according to claim 7, wherein the control module is arranged to determine that data is to be read into the data buffer when the amount of data stored in the data buffer is below a predetermined threshold.

9. A system according to claim 5, further comprising a storage medium I/O module in the kernel space for controlling reading from and writing to the storage medium under the control of the control module.

10. A system according to claim 9, wherein the control module comprises a first process for communicating with an upper level protocol handler and a second process for communicating with the storage medium I/O module.

11. A system according to claim 10, wherein the first and second processes are arranged to run concurrently.

12. A system according to claim 11, wherein the second process is arranged to determine whether data is to be written to or read from the storage medium independently of the first process.

13. A system according to claim 1, wherein the system comprises a virtual tape library.

14. A method of managing data transfer in an operating system address space, the operating system address space comprising a user space and a kernel space, a system comprising a data buffer in the kernel space and a control module for the data buffer, the control module in the user space and arranged to maintain address information for the data buffer, the method comprising:
- receiving an I/O request in an interface module of the kernel space for performing an I/O operation on the data buffer to transfer data into or out of the data buffer in the kernel space, the interface module comprising a lower level protocol handling module;
- notifying the control module of the I/O request via an upper level protocol handling module in the user space configured to receive the I/O request from the lower level protocol handling module and to pass the I/O request to the control module;
- receiving address information from the control module for controlling the I/O operation; and
- transferring data into or out of the data buffer without copying the data between the user space and the kernel space.

15. A method according to claim 14, wherein the control module comprises a first process that receives and responds to the I/O request and a second concurrent process that determines whether data in the data buffer should be written to or read from a storage medium.

16. A system for managing data transfer using an operating system address space, the operating system address space comprising a user space and a kernel space, the system comprising a data buffer in the kernel space and a control module for the data buffer, the control module in the user space and arranged to maintain address information for the data buffer, the system further comprising:
- means for receiving an I/O request in an interface module of the kernel space for performing an I/O operation on the data buffer to transfer data into or out of the data buffer in the kernel space, the interface module comprising a lower level protocol handling module;
- means for notifying the control module of the I/O request via an upper level protocol handling module in the user space configured to receive the I/O request from the lower level protocol handling module and to pass the I/O request to the control module; and
- means for receiving address information from the control module for controlling the I/O operation;
- wherein the data to be transferred into or out of the data buffer is not copied between the kernel space and the user space.

* * * * *